April 3, 1945.  C. WULSTEIN  2,373,070
CLIP
Filed Dec. 9, 1942  2 Sheets-Sheet 1
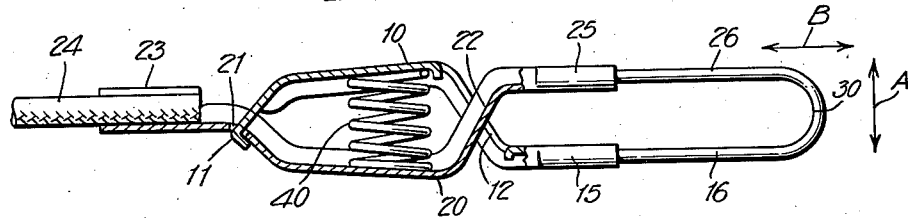
FIG.1.
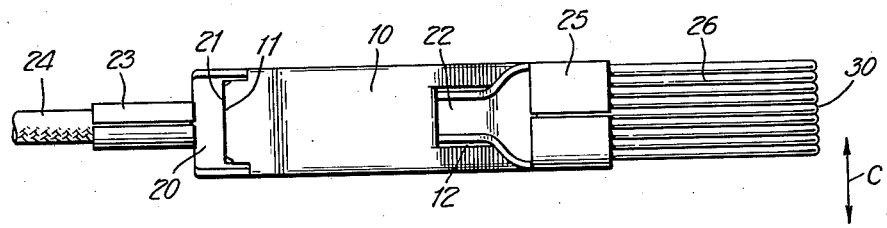
FIG.2.
FIG.3.  FIG.4.  FIG.5.
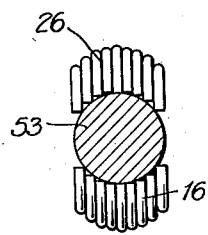 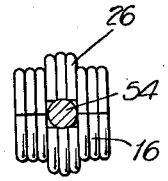 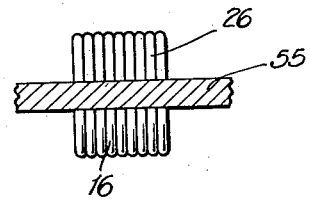
FIG.6.  FIG.7.
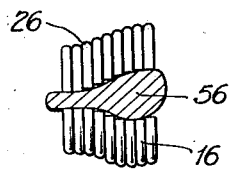 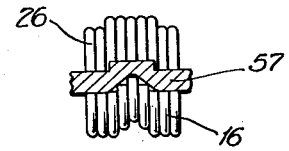
INVENTOR.
CHARLES WULSTEIN.
BY
Knight Brothers
ATTORNEYS.

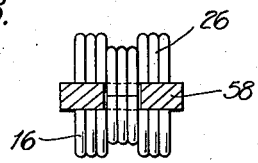
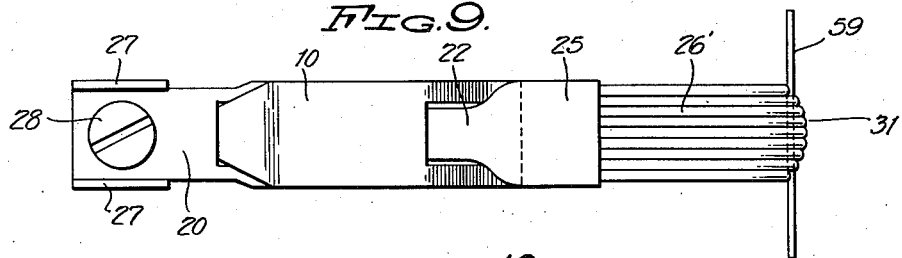
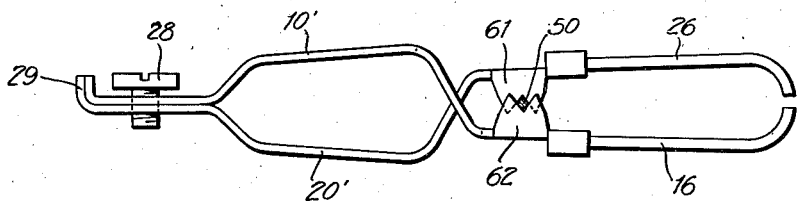
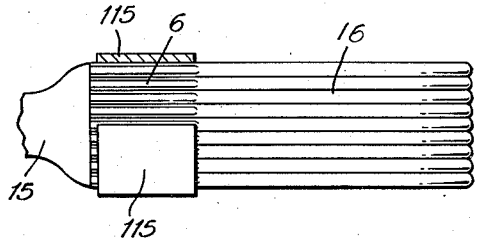
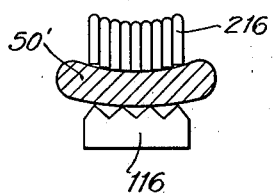
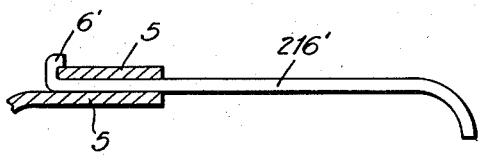
INVENTOR.
CHARLES WULSTEIN.

Patented Apr. 3, 1945

2,373,070

UNITED STATES PATENT OFFICE 2,373,070

CLIP

Charles Wulstein, New York, N. Y., assignor to himself and Murray Gordon, both of New York, N. Y.

Application December 9, 1942, Serial No. 468,350

3 Claims. (Cl. 24—261)

My invention relates to clips of the pincer type and more particularly to contact clips for making temporary electrical connections, for instance, for testing purposes.

It is known to design electrical contact clips as a spring-biased pincer-shaped structure with serrated pincer jaws capable of gripping electrical conductors of different thickness or diameter.

These known types of clips, usually called alligator clips or universal clips, are satisfactory only if the conductors to which the clip is to be attached have a fairly regular shape and remain within a relatively limited range of thickness at the point to be clamped. There are many cases where these conditions cannot readily be complied with. For instance, when using contact clips for testing the electric system of an automobile or other machine and apparatus, it often becomes desirable to attach an electric supply or test cable to some conveniently located part or projection of a machine body, casing or the like accessory not offering a standardized or regular cross-sectional shape or thickness. The known clips are not well suitable for such irregular uses, and even if sufficient for gripping the intended object do not ensure a safe and steady electrical contact of satisfactorily low contact resistance.

Another drawback of the known clips is the fact that the electrical contact between the clip and the electrical conductor engaged by the jaws of the clip occurs as a rule at only three or in any event at only a few points. This tends to increase the electric contact resistance and, in some cases, to produce undue heating at the jaws of the clip. If irregular bodies are to be clamped, as mentioned in the foregoing, the limited number of actual contact points is all the more detrimental.

It is an object of my invention to eliminate these shortcomings of universal-type clips. More in particular, the invention aims at providing pincer-type clips capable of adapting themselves readily and automatically to bodies whose thickness or diameter at the point to be clamped may vary between wider limits than heretofore safely admissible for the known clips of comparable size. Another more specific object, associated with the foregoing, is to render such a clip capable of adjusting itself to highly irregular shapes and thicknesses of the parts to be clamped and, still further, to ensure a multiple-point contact engagement under the irregular conditions just mentioned.

To achieve these ends, the present invention consists in a pincer-shaped clip whose jaws are subdivided into a plurality of elastic members, arranged in parallel to each other, so that the clamping front of the jaws presents a number of elastically yielding contact elements capable of moving relatively to one another and largely independent of the other members like the fingers of a human hand. According to another feature of the invention, the elastically movable members of each jaw of the clip consist of pieces of spring wire, these pieces lying close to one another so as to give the jaw the appearance of a continuous body. The free ends of the just-mentioned elastic members or pieces of spring wire form a row of clamping points extending substantially transverse to the longitudinal axis of the clip structure.

As a rule, two correlated elasticities are required for a clip according to the invention. One of these elasticities is represented by the customary spring or elastic member tending to keep the jaws in closed position and permitting the clip to be roughly adjusted to different thicknesses of the objects to be clamped. The other elasticity, or rather group of elasticities, is represented by the aforementioned individual elastic members of the jaws, and serves to adapt the jaws to irregularities in the shape and thickness of the objects.

These and other features of my invention will be fully understood from the following description of the embodiments illustrated in the drawings in which Fig. 1 is a part-sectional side elevation of a clip according to the invention;

Fig. 2 a top view of the same clip, while

Figs. 3 through 8 show views of the clamping end of the same clip clamped to objects of different shapes and thicknesses, these objects being shown in cross section;

Fig. 9 shows a top view of a second embodiment especially designed for clamping objects of extremely small thickness;

Fig. 10 is a side elevation of a third embodiment having lateral auxiliary jaws attached to a clip otherwise similar to that of Fig. 1;

Fig. 11 represents a view on the clamping end of a fourth embodiment; and

Figs. 12 and 13 show two different ways of securing the individual prong members of a clip, according to the invention, to their holder.

Referring at first to Figs. 1 and 2, the illustrated clip contains two members 10 and 20 hinged to each other at an inner fulcrum by means of a projection 11 of member 10 engaging a slot 21 of member 20. The middle portion 22 of member 20 passes through an opening 12 of member 10 so that both form a pincer-like assembly. Member 20 forms a terminal 23 for attaching the clip to another body such as the illustrated electric cable 24. Firmly attached to the opposite or outer end 25 of member 20 is a set of elastic jaw elements consisting of a plurality of similar pieces of spring wire 26, for instance, of bronze. These pieces of spring wire 26 thus constitute a multiplicity of individually and independently resilient contact fingers for engaging an interposed conductor. The corresponding end portion 15 of clip member 10 is provided with a similar set of elastic jaw elements 16. Six to twelve elements for each jaw are, as a rule, sufficient. The free ends of each of the multiple jaws are bent towards the other jaw and, at 30, lie substantially on a straight line extending transverse to the longitudinal axis of the clip structure.

A coil spring 40, or some equivalent spring element, is placed between the members 10 and 20 so as to keep the jaws of the clip normally in closed position. The spring 40, or equivalent, permits adjusting the clip roughly to the width of the object to be clamped and is the main source of the contact pressure once the clip has been closed upon the object. Obviously, any spring or elasticity inherent in the clip structure meeting these requirements could be utilized instead of the coil spring exemplified in Fig. 1.

For applying the clip, the clip portion adjacent to spring 40 is compressed thereby overcoming the force of the spring and opening the jaws. The clip is then placed over the object and released. The clamping effect now acting on the object is apparent from Figs. 3 through 7.

According to Fig. 3, the object 53, gripped between the multiple jaws 16 and 26 of the clip, has a circular cross section of relatively large diameter at the clamping point. It will be seen that the individual elements of each jaw, under the resilient force of the spring 40, adjust themselves elastically to the round shape of the object by moving relatively to the adjacent elements of the jaw. As a result, the object is contacted at many points along its periphery, thereby ensuring a safe grip and a steady electric connection at a multiplicity of contact points.

Fig. 4 shows that the same clip is capable of clamping a much thinner cylindrical object 54 with similar safety.

Fig. 5 represents a case where the same clip is placed on an object 55 of rectangular cross section, while Figs. 6 and 7 show the clip applied to objects 56 and 57, respectively, of highly irregular shape and width. According to Fig. 8, the clip is placed over a body 58 having an opening so that some of the clamping ends enter into the opening and thus secure the clip more safely from being pulled out of engagement. In all of these cases, the subdivided jaws follow the contour of the clamped body and ensure a safe and multiple contact engagement. It will be noted that even in the case of a flat contact surface as represented by Fig. 5, for instance, the contact occurs at many points, as compared with the known rigid clip jaws with only a small number of actual contact engagements.

Referring to Fig. 9, the modified embodiment here illustrated is in many respects similar to that of Figs. 1 and 2, as is indicated by the use of the same numerals for corresponding elements. However, the clip shown in Fig. 9 differs as regards the following features:

The jaws of the clip are formed of spring wires, like those denoted by 26', whose lengths are different so that the free ends of the wires, at 31, extend along a curve, which recedes at both sides from the outermost point of the jaw. This renders the clip especially suitable for clamping extremely thin objects such as represented by the wire 59. These wires can be placed in transverse direction to the main extension of the clip. When clamping larger objects, they may extend longitudinally or at any desired angle to the clip as in the case of the clip of Figs. 1 and 2.

The terminal end of the clip shown in Fig. 9 contains a contact screw 28 threaded into element 20. Two projections 27 are formed of element 20 to permit attaching an electric cable to the clip by clamping the cable end firmly between the projections and the stem of screw 28.

The embodiment illustrated in Fig. 10, while also showing the general characteristics of the clips previously described, has two clip members 10' and 20' formed of an inherently elastic material designed to render a separate pressure spring unnecessary. The two members 10' and 20' are joined together, for instance, by welding or soldering, at their inner end 29, which at the same time may serve as an abutment to cooperate with a clamping screw 28.

The multiple jaws 16 and 26 are designed in the same manner as described in the foregoing with respect to Figs. 1 through 7. This embodiment, however, contains also a set of lateral jaws 61 and 62 forming part of the clip members 20' and 10' respectively. These lateral jaws are serrated and designed for clamping objects, such as wire 50, of extremely small diameter. The lateral jaws 61 and 62 are preferably provided at both sides of the clip. Larger objects are clamped by the elastic subdivided jaws 16 and 26 as described above.

It will be seen that the construction of the terminal of the clip is different in the three exemplified embodiments. As a matter of fact, the design of this end can be modified in various known ways, depending on the particular purpose of the clip, and is not an essential feature of my invention proper.

Fig. 12 exemplifies one way of attaching the individual elastic prong members of the jaw to their holder. The illustrated holder, for instance, is similar to the corresponding portion of pincer member 15 as shown in Figs. 1 and 2. The member 15 has extensions 115 bent around the ends 6 of the wire pieces 16 and the latter are soldered or sweated in their seat. These ends 6 may be squared to prevent the pieces 16 from revolving, while the main portion of the wire pieces 16 has preferably a round cross section.

Another attachment is shown in Fig. 13. In this case, the ends 6' of the individual elastic members 216' are bent around the edge of the holder 5 to prevent the members 216' from turning. This figure also shows that the holder 5 of the jaw members may form an element detached from the closure or pincer mechanism so that the subdivided jaws form separate and self-containing units to be inserted in clips of the ordinary known type in order to convert them for uses according to the present invention.

When providing clips according to the invention for electrical purposes, for instance, in order to make temporary connections for testing or measuring, I prefer making the elastic elements of the multiple jaws of bronze or the like metal combining elasticity with good electric conductivity. Where less or no exacting electrical conditions are to be met, some other material such as spring steel may be used to advantage.

Having thus described my invention, what I claim is set forth in the claims following hereinafter. When mentioning in these claims, for the purpose of definition, the direction of the clamping motion of the jaws, I am referring to the closing and opening direction exemplified by the arrow A in Fig. 1 of the drawings. The subdivision of the jaw extends at a right angle to the just-mentioned direction as is indicated in Fig. 1 by the arrow B. The clamping or contact ends of the elastic jaw members are aligned in a direction at right angles to both directions A and B. An arrow, marked C, is shown in Fig. 2 to indicate the general direction of this alignment.

I claim:

1. A manually-opened, spring-closed clip for making multi-point electrical contact with conductors of various thicknesses and contours, comprising in combination a pair of opposed clamping jaws secured together at an inner fulcrum but freely movable toward and away from each other at their outer ends, each of said clamping jaws terminating in a multiplicity of individually and independently resilient contact fingers directed at their free ends toward the free end of the opposing jaw, said ends being alined on a curved transverse contour receding at both sides from the interior, and means for applying to the two jaws in common a main resilient force urging said opposed clamping jaws toward each other at their terminal ends in opposition to the individual resilient forces of the respective contact fingers as they engage and establish contact with an interposed conductor.

2. A manually-opened, spring-closed clip for making multi-point electrical contact with conductors of various thicknesses and contours, comprising in combination a pair of opposed clamping jaws secured together at an inner fulcrum but freely movable toward and away from each other at their outer ends, each of said clamping jaws terminating in a multiplicity of individually and independently resilient contact fingers disposed for a substantial part of their length in a plane parallel to the said fulcrum and to the fingers of the other jaw, the fingers of each jaw being directed at their free ends toward those of the other in substantial registry and alinement, and means for applying to the two jaws in common a main resilient force urging said opposed clamping jaws toward each other at their terminal ends in opposition to the individual resilient forces of the respective contact fingers as they engage and establish contact with an interposed conductor.

3. A manually-opened, spring-closed clip for making multi-point electrical contact with conductors of various thicknesses and contours, comprising two cooperative clamping jaws, hinged together, spring-closed to clamp an object between them and having means for applying manual pressure to open them, each of said jaws having its clamping end divided, in planes parallel to that of the clamping motion of the jaws, into a series of wire-like jaw elements, of sufficient resilience to be flexed by the force of the jaw-closing spring, the elements of each jaw lying over most of their length in one plane and, at their clamping ends, bent toward each other in the direction of the clamping motion to terminate in lines parallel to and intermediate the planes of the main body of the jaw elements.

CHARLES WULSTEIN.